(12) United States Patent  
Marshall

(10) Patent No.: US 6,796,606 B2
(45) Date of Patent: Sep. 28, 2004

(54) AUTOMOBILE SEAT PROTECTOR

(76) Inventor: Christopher John Marshall, 16532 Wikiup Rd., Ramona, CA (US) 92065

( * ) Notice: Subject to any disclaimer, the term of this patent is extended or adjusted under 35 U.S.C. 154(b) by 0 days.

(21) Appl. No.: 09/932,671

(22) Filed: Aug. 17, 2001

(65) Prior Publication Data

US 2003/0034677 A1 Feb. 20, 2003

(51) Int. Cl.⁷ .......................... A47D 15/00; A47C 1/08; A47C 31/00; A47C 7/62
(52) U.S. Cl. ............. 297/182; 297/250.1; 297/256.16; 297/219.1; 297/219.12; 297/188.2; 5/655
(58) Field of Search .............................. 297/182, 250.1, 297/256.16, 219.1, 219.12, 188.2; 5/655, 606; 4/580, 581, 559; 15/215

(56) References Cited

U.S. PATENT DOCUMENTS

| | | | |
|---|---|---|---|
| 2,938,574 A | 5/1960 | Brown | 155/188 |
| 4,165,123 A | 8/1979 | Hutson | 297/153 |
| 4,478,453 A | 10/1984 | Schutz | 297/219 |
| 4,728,151 A | * 3/1988 | Neufeld | 297/423.4 |
| 4,848,834 A | 7/1989 | Linski | 297/182 |
| 4,883,701 A | 11/1989 | Rankin et al. | 428/136 |
| 4,885,200 A | 12/1989 | Perdelwitz, Jr. et al. | 428/136 |
| 4,891,454 A | 1/1990 | Perdelwitz, Jr. et al. | 428/137 |
| 4,955,666 A | 9/1990 | Baker | 297/182 |
| 5,120,108 A | * 6/1992 | Watson et al. | 297/188.2 |
| 5,188,421 A | 2/1993 | Arseneault | 297/182 |
| 5,228,745 A | 7/1993 | Hazel | 297/229 |
| 5,457,820 A | 10/1995 | Yielding | 2/49.1 |
| 5,549,353 A | 8/1996 | Gaudet et al. | 297/182 |
| 5,567,008 A | * 10/1996 | Cone, II | 297/256.16 |
| 5,820,215 A | 10/1998 | Dreisbach | 297/256.16 |
| 6,000,753 A | * 12/1999 | Cone, II | 418/248 |
| 6,276,752 B1 | * 8/2001 | Conte | 297/182 |

* cited by examiner

Primary Examiner—Peter M. Cuomo
Assistant Examiner—Sarah C. Burnham
(74) Attorney, Agent, or Firm—Mark Snyder

(57) ABSTRACT

The present invention relates to devices for the protection of vehicle interiors, including seats and foot wells, from being soiled by objects, liquids, foods, and the like discarded by children restrained in safety seats. The devices include single-piece and multiple-piece mats for placement between the vehicle seat and the safety seat, that include flanges for containment of the discarded objects, liquids, foods and the like.

18 Claims, 22 Drawing Sheets

AUTOMOBILE SEAT PROTECTOR

FIELD OF THE INVENTION

The present invention relates to a device for the protection of automobile seats from wear and being soiled by objects, liquids, foods, and the like discarded by children seated in safety seats.

BACKGROUND OF THE INVENTION

The use of automobile safety seats for protecting young children in the event of an automobile collision has become required in the United States and in many other countries throughout the world. Such safety seats typically are placed on a seat within an automobile and fastened in place with a safety belt. Additional features contained within the safety seat ensure that the child remains seated in place during travel in the automobile.

Typical automobile safety seats have the effect of elevating the child from the automobile seat surface. From this elevated position, children fastened into the automobile safety seat can drop, toss or throw numerous items, such as toys, clothing, shoes, food and drinks into the automobile seat, soiling the upholstery of the automobile. These items can roll away from the child along the automobile seat surface, or fall into the foot wells of the car. When such items roll around in the automobile during travel the items are capable of soiling a greater surface area within the automobile, and make it difficult for the child or the parents to locate the discarded item.

Although automotive safety seats are designed primarily to protect a child in the event of a collision, some seat designs do permit limited capture of small toys, liquids and foods discarded by the occupant of the seat. Many automotive safety seats are formed of molded plastic and contain a fabric cover with foam padding for comfort and fit of the child into the safety seat surface. Items carried by a child into the automobile, or given to a child in the safety seat can be placed or lodged into the confined spaces of the safety seat immediately around the body of the child. In some cases, the molded shell of the safety seat is capable of holding liquid spills from filtering down onto the automobile seat surface and the crevice between the automobile seat surface and the automobile seat back.

Such safety seats do not, however, provide significant protection to the automobile interior for objects that are dropped from the hands or feet of the restrained child. Although safety seats are designed to restrain children during travel of the automobile, they typically allow for free movement of the restrained child's limbs, from which items may be dropped thrown or tossed by the child.

One device that has been designed to protect the interior of an automobile is described within U.S. Pat. No. 5,549,353, by Gaudet et al., entitled "CAR SEAT MAT". The device described within the '353 patent however, is primarily directed toward removal and protection of the automobile foot well surfaces from being soiled by dirt, snow and water borne by a child's feet.

Another device that has been designed to protect the interior of an automobile is described within U.S. Pat. No. 5,188,421, by Arseneault entitled "ENTERTAINMENT AND FEEDING DEVICE FOR USE BY CHILDREN IN AUTOMOBILES". The device described within the '421 patent however, is primarily directed toward providing an entertainment system for a restrained child in an automobile. In addition, the described device attaches to the restrained child, making it unsuitable for use with many automobile safety seats.

Accordingly, there is a need for a protective device for protecting the interior of an automobile from objects discarded by a child restrained in an automobile safety seat.

SUMMARY OF THE INVENTION

One object of the present invention is to provide a device for protecting the interior of an automobile from damage from objects discarded by a child restrained in an automobile safety seat.

Another object of the present invention is to provide a device for protecting the interior of an automobile from being soiled by objects discarded by a child restrained in an automobile safety seat.

Another object of the present invention is to provide a device for containing objects discarded by a child restrained in an automobile safety seat from moving about within the automobile during travel.

A further object of the present invention is to provide a device for protecting the interior of an automobile from being soiled by liquids spilled by a child restrained in an automobile safety seat.

Yet further objects and advantages of the present invention will become apparent as the present invention is herein further described.

In accordance with the present invention, devices for protecting the interior seat, seat back and foot well of a moving vehicle from being soiled by a child in a safety seat are provided. These devices include a mat having a conformal surface for placement between a safety seat and the seat of the vehicle. The mat of the present invention has a lateral dimension that extends beyond the lateral confinement of the safety seat and has a flange outwardly extending from the conformal surface and around at least a portion of the perimeter of the mat. The flange and conformal surface define a containment area for containment of liquid spills within the mat. The mat also has a longitudinal dimension that extends beyond the base of the safety seat and into the foot well to prevent soiling of the horizontal and vertical foot well surfaces. Yet further, the mat may include one or more pass-throughs for a safety belt. The pass-throughs contain features which maintain the integrity of the containment area for containment of liquid spills within the mat.

Further in accordance with the present invention, devices for protecting the interior seat, seat back and foot well of a moving vehicle from being soiled by a child in a safety seat are provided that include a mat having a conformal surface that includes a horizontal portion that conforms to the automobile seat, a vertical portion that conforms to the vertical foot well surface, and a horizontal portion that conforms to the horizontal foot well surface. In addition, the mat may further include a vertical portion that conforms to the vertical seat back of the automobile.

The foregoing summary of the invention and further embodiments of the present invention can be better understood by reference to the following drawings and detailed description.

DETAILED DESCRIPTION

Figure 1:
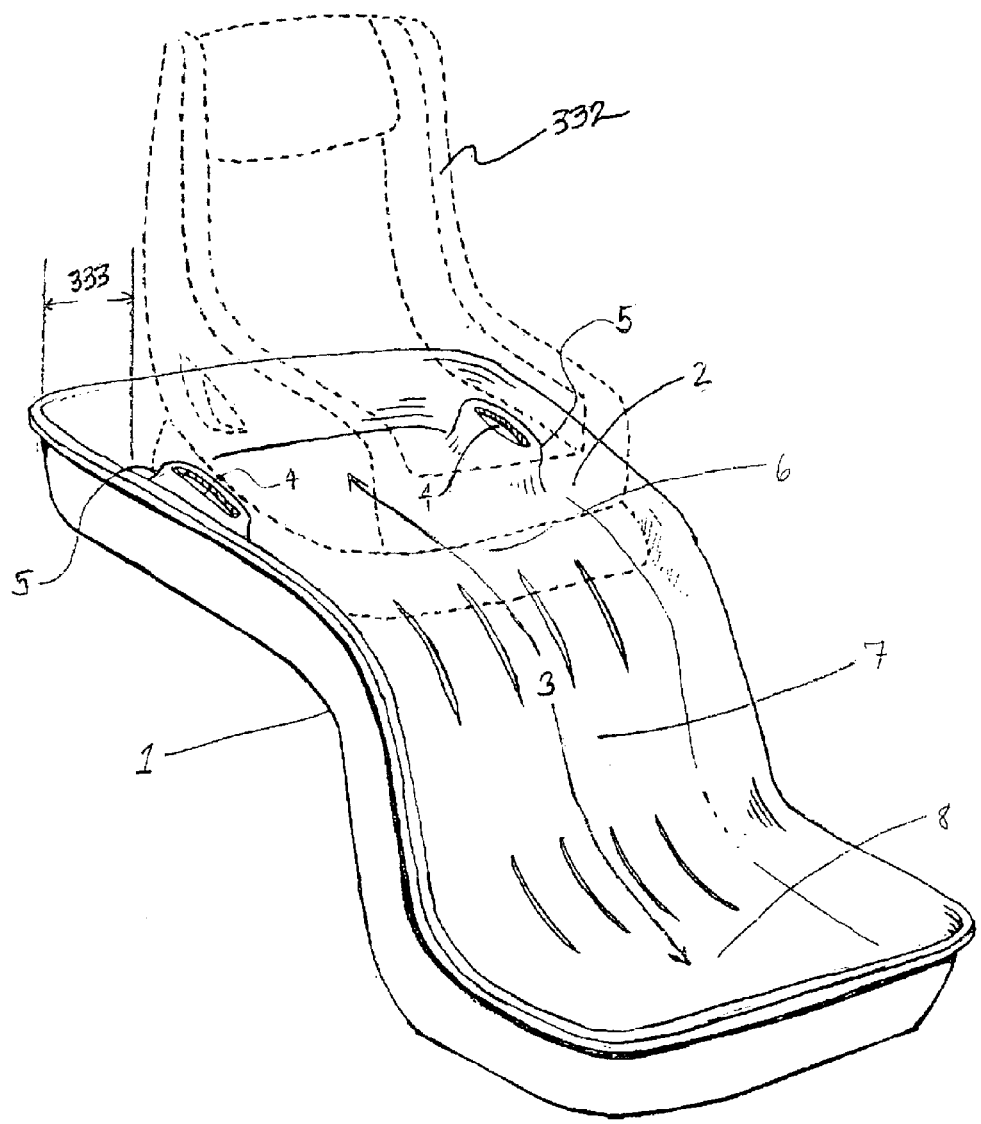
FIG. 1 is a perspective view of one embodiment of the single-piece protective devices of the present invention.

As described more fully below, the present invention is directed toward protective devices for the interior of an automobile. More specifically, the protective devices are intended for use with an automotive safety seat, to protect the automobile interior from wear from the safety seat and from objects discarded by a child restrained in the safety seat.

The present invention includes a mat which conforms substantially to the surfaces to be protected within the automobile. As used herein, the term "conforms" means that the mat approximates the same general features of a surface that is in close proximity to the mat. In this regard, the mat need not be in contact with such adjacent surfaces, and in some instances may be set-off from such adjacent surfaces. In the present invention, the mat may have numerous surfaces that substantially conform to the automobile seat surfaces and passenger foot well surfaces. Accordingly, there are numerous embodiments of the protective devices of the present invention.

A safety seat used in conjunction with the devices of the present invention is installed on top of the mat. As a result and when in use, the mat is placed between the safety seat and the automobile seat surfaces. Preferably, the mat includes surfaces that substantially conform to the automobile seat to allow use of nearly any safety seat that is compatible with the automobile seat itself.

The mat has a longitudinal dimension, and a lateral dimension. The longitudinal dimension refers to the axis of the mat in the direction of the feet to head of an occupant in a safety seat when using the device of the present invention. The lateral dimension refers the axis of the mat in the side to side or arm to arm direction of an occupant in a safety seat when using the device of the present invention. In most embodiments of the present invention, the longitudinal dimension of the mat will exceed the lateral dimension of the mat.

In one embodiment of the present invention, the mat includes surfaces that conform substantially to the automotive seat, the vertical surface of a passenger foot well below the seat, and at least a portion of the substantially horizontal surface of the passenger foot well. In another embodiment of the present invention, the mat includes surfaces that conform substantially to the automotive seat back, the automotive seat, the vertical surface of a passenger foot well below the seat, and at least a portion of the substantially horizontal surface of the passenger foot well. In yet another embodiment of the present invention, the mat includes surfaces that conform substantially to the automotive seat, and at least a portion of the substantially horizontal surface of the passenger foot well. In yet a further embodiment of the present invention, the mat includes surfaces that conform substantially to the automotive seat back, the automotive seat, and at least a portion of the substantially horizontal surface of the passenger foot well.

An important feature of the protective devices of the present invention is the ability of the mat to catch and collect items discarded by the child restrained in the safety seat. Accordingly, the mat extends beyond the confines of the safety seat laterally to catch and collect dropped, thrown or tossed items. Such items include toys, clothing, shoes, food and beverages. In addition, the mat extends beyond the confines of the safety seat longitudinally both to catch items discarded, and to collect items that have been discarded by the child.

Although the scope of the present invention should not be interpreted narrowly to include specific lateral and longitudinal dimensions, it is preferred that at least a portion of a conformal surface of the mat extend laterally at least about 2 inches (5.08 centimeters), and up to about 24 inches (60.96 centimeters) from each side of the safety seat. It is within the scope of the present invention to provide mats which differ in dimensions to correspond to the seat dimensional constraints of the specific automobile, as well as the specific safety seat to be used by the consumer. More preferably, at least a portion of a conformal surface of the mat extends laterally at least about 4 inches (10.16 centimeters), and up to about 12 inches (30.48 centimeters) from each side of the safety seat. Extension of the mat beyond 12 inches (30.48 centimeters) laterally from each side of the safety seat makes it impractical in many automobiles to place the mat and safety seat close to the doors of the automobile, and next to other safety seats. It should be understood, however, that the lateral extension of the mat from the safety seat need not be symmetrical, and the mat may extend unevenly from each side of the safety seat. In some embodiments of the present invention, the mat may be capable of accommodating two or three safety seats placed in a side-by-side configuration.

The mat also contains a ridge or flange that extends along the perimeter of the seat. This ridge extends substantially normally from the conformal surfaces of the mat to create a containment area within the mat for items discarded by the restrained child. The ridge extends greater than about 1 inch (2.54 centimeters) substantially normally from the conformal surfaces of the mat. Preferably, the ridge extends greater than about 2 inches (5.08 centimeters) substantially normally from the conformal surfaces of the mat. Most preferably, the ridge extends greater than about 3 inches (7.62 centimeters) substantially normally from the conformal surfaces of the mat. It should be expressly understood that in some embodiments of the present invention, the ridge may extend greater in some portions of the mat perimeter than in others. Accordingly, in those embodiments of the present invention which incorporate a mat surface that conforms substantially to the seat back of an automobile seat, such mat portion can be viewed as an extended ridge portion from the horizontal mat surface that conforms to the automobile seat back surface.

For liquid containment it is desired that the containment area of the mat be capable of containing at least one-half liter of liquid when installed in an automobile. Preferably, it is desired that the containment area of the mat be capable of containing at least one liter of liquid when installed in an automobile.

The mat can also contain features that allow for passage of an automobile's safety seat restraining belt, which are typically used to affix the safety seat to the automobile seat. These features include, but are not limited to, at least one pass-through in the mat surface. In a preferred embodiment, the mat contains two pass-throughs to allow passage of a safety belt for securing the safety seat to the automobile seat. These pass-throughs are selectively placed on the mat surface in a position that allows for insertion of the safety seat onto the mat, typically on each side of the safety seat, and do not interfere with the installation or performance of the safety seat once installed. The pass-throughs are small openings in the mat surface, having a ridge extending around the opening perimeter. Similar to the ridge extending around the mat perimeter, the pass-through ridge extends substantially normally from the conformal surfaces of the mat to maintain the containment area within the mat for liquids and items discarded by the restrained child. The pass-through ridge extends greater than about 1 inch (2.54 centimeters) substantially normally from the conformal surfaces of the mat. Preferably, the pass-through ridge extends greater than about 2 inches (5.08 centimeters) substantially normally from the conformal surfaces of the mat. Most preferably, the pass-through ridge extends greater than about 3 inches (7.62 centimeters) substantially normally from the conformal surfaces of the mat.

The pass-through can also take the form of contours in the flange or mat perimeter itself, near the point where the automobile seat and automobile seat back contact the mat. In such embodiment, the perimeter ridge of the mat maintains the integrity of the containment area for liquids and items discarded by a child restrained in the safety seat.

The mat can be constructed of a number of materials, such as various polymers, plastics and rubber. In a preferred embodiment, the mat is constructed of a flexible polymer material, which maintains the shape of the mat, yet allows for conformability of the mat to the automobile seat, seat back and passenger foot well. Even more preferably, the mat can be textured, and provide a soft feel to the touch, yet remains easy to clean and is resistant to most liquids.

The mat may be constructed of a single piece, such as of a molded material, or may be constructed of multiple pieces. When used herein, the phrase "single piece" means that the various aspects of the mat when in use are interconnected together to provide a unitary device. Accordingly, a single piece should be interpreted to include those devices whereby the various portions of the mat are connected by joints or other fastening means. When used herein, the phrase "multiple pieces" means that at least two portions of the mat, when in use, are not interconnected together.

In one embodiment, the mat is a single piece, and when installed in an automobile contains at least one substantially horizontal surface that conforms to the seat of the automobile. In another embodiment, the mat is a single piece, and when installed in an automobile contains at least one substantially horizontal surface that conforms to the seat of the automobile, and at least one substantially vertical surface that conforms to the vertical surface of a passenger foot well beneath the automobile seat. In another embodiment, the mat is a single piece, and when installed in an automobile contains at least one substantially horizontal surface that conforms to the seat of the automobile, and at least one substantially vertical surface that conforms to the automobile seat back. In another embodiment, the mat is a single piece, and when installed in an automobile contains at least one substantially horizontal surface that conforms to the seat of the automobile, and at least one substantially horizontal surface that conforms to the horizontal surface of a passenger foot well. In yet another embodiment, the mat is a single piece, and when installed in an automobile contains at least one substantially horizontal surface that conforms to the seat of the automobile, at least one substantially vertical surface that conforms to the vertical surface of a passenger foot well beneath the automobile seat, and at least one substantially horizontal surface that conforms to the horizontal surface of a passenger foot well. In yet another embodiment, the mat is a single piece, and when installed in an automobile contains at least one substantially horizontal surface that conforms to the seat of the automobile, at least one substantially vertical surface that conforms to the automobile seat back, at least one substantially vertical surface that conforms to the vertical surface of a passenger foot well beneath the automobile seat, and at least one substantially horizontal surface that conforms to the horizontal surface of a passenger foot well.

In another embodiment, the mat is multiple pieces, and when installed in an automobile contains at least one substantially horizontal surface that conforms to the seat of the automobile, and at least one substantially horizontal surface that conforms to the horizontal surface of a passenger foot well. In another embodiment, the mat is multiple pieces, and when installed in an automobile contains at least one substantially horizontal surface that conforms to the seat of the automobile, at least one substantially vertical surface that conforms to the automobile seat back, and at least one substantially horizontal surface that conforms to the horizontal surface of a passenger foot well.

For convenience of storage and transportation of the present invention when it is not in use, the mat may contain features that allow for folding of the mat upon itself. Such features can include, but not be limited to hinged sections between the various substantially horizontal and vertical surfaces of the mat. Alternatively, the mat itself may be designed to be flexible enough to allow it to be folded substantially flat for storage. The mat may also contain fastening members to keep the mat in a folded position during storage.

The present invention will now be described in more detail with respect to the drawings. As shown in the perspective view in FIG. 1, one embodiment of the present invention includes a single-piece mat 1, having a ridge 2 around the perimeter of the mat 1 that extends outward substantially normally from the mat surface to create a containment area 3 within the mat. The mat also contains pass-throughs 4 for the safety belts of an automobile seat. The pass-throughs 4 of the mat 1 also contain ridges 5 along their perimeters that maintain the integrity of the mat containment area 3. The single-piece mat 1 contains at least one substantially horizontal surface 6 that conforms to the seat of the automobile, at least one substantially vertical surface 7 that conforms to the vertical surface of a passenger foot well beneath the automobile seat, and at least one substantially horizontal surface 8 that conforms to the horizontal surface of a passenger foot well. Also shown in FIG. 1 in outline form is a safety seat 332 positioned on mat 1. As shown in FIG. 1, the mat extends laterally 333 beyond the base of the safety seat 332. This lateral extension of the mat allows for capture of items discarded by the occupant of the safety seat.

Figure 2:
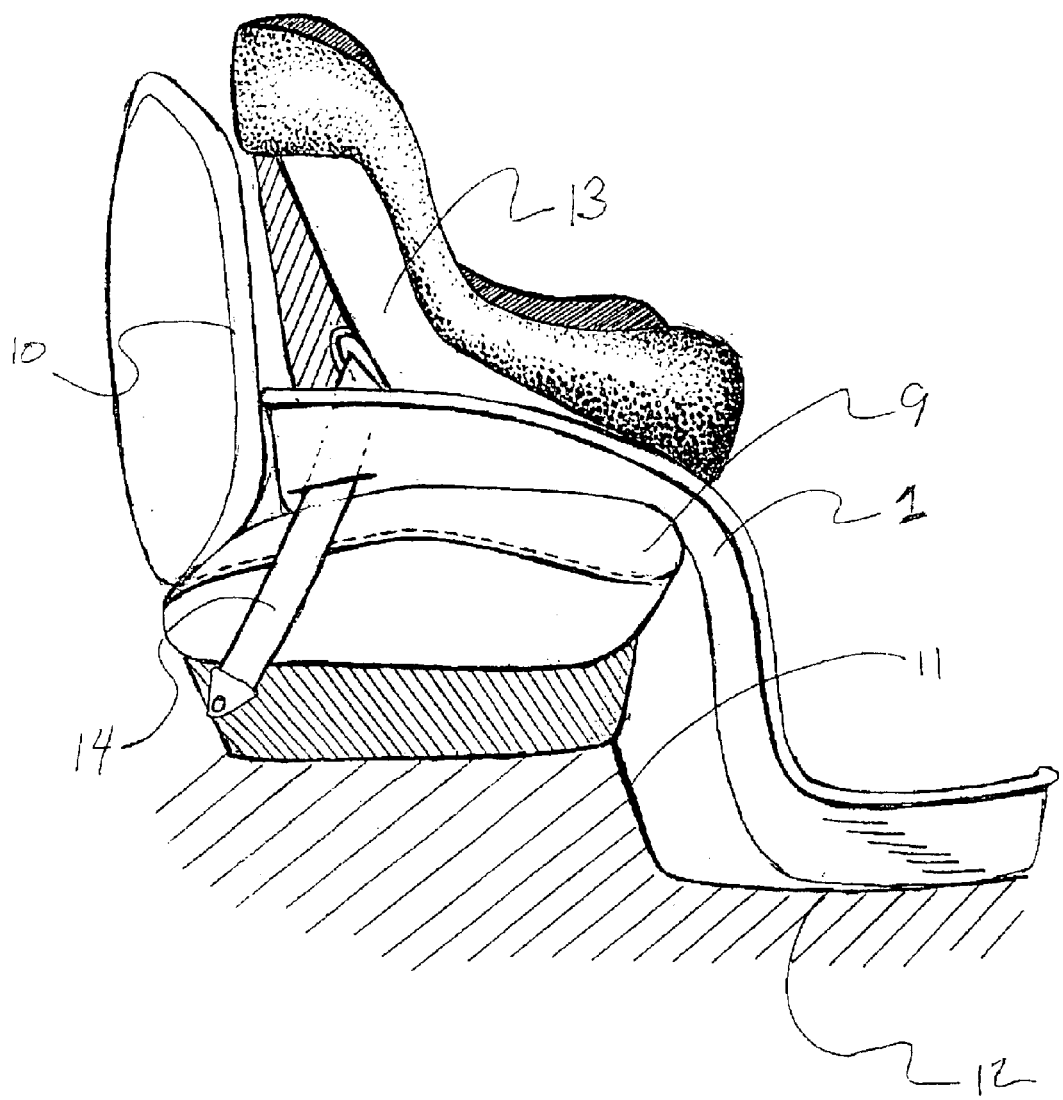
FIG. 2 is a profile view of one embodiment of the single-piece protective devices of the present invention as installed on an automobile seat.

In FIG. 2, the single-piece mat 1 of FIG. 1 is shown in profile view as installed on an automobile seat 9. Safety seat 13 is installed on top of the mat 1, and held in place with the seat belt 14. Conformal surfaces of mat 1 conform to the vertical surface of the seat back 10, the horizontal surface of the seat 9, the vertical surface of the foot well 11, and the horizontal surface of the foot well 12.

Figure 3:
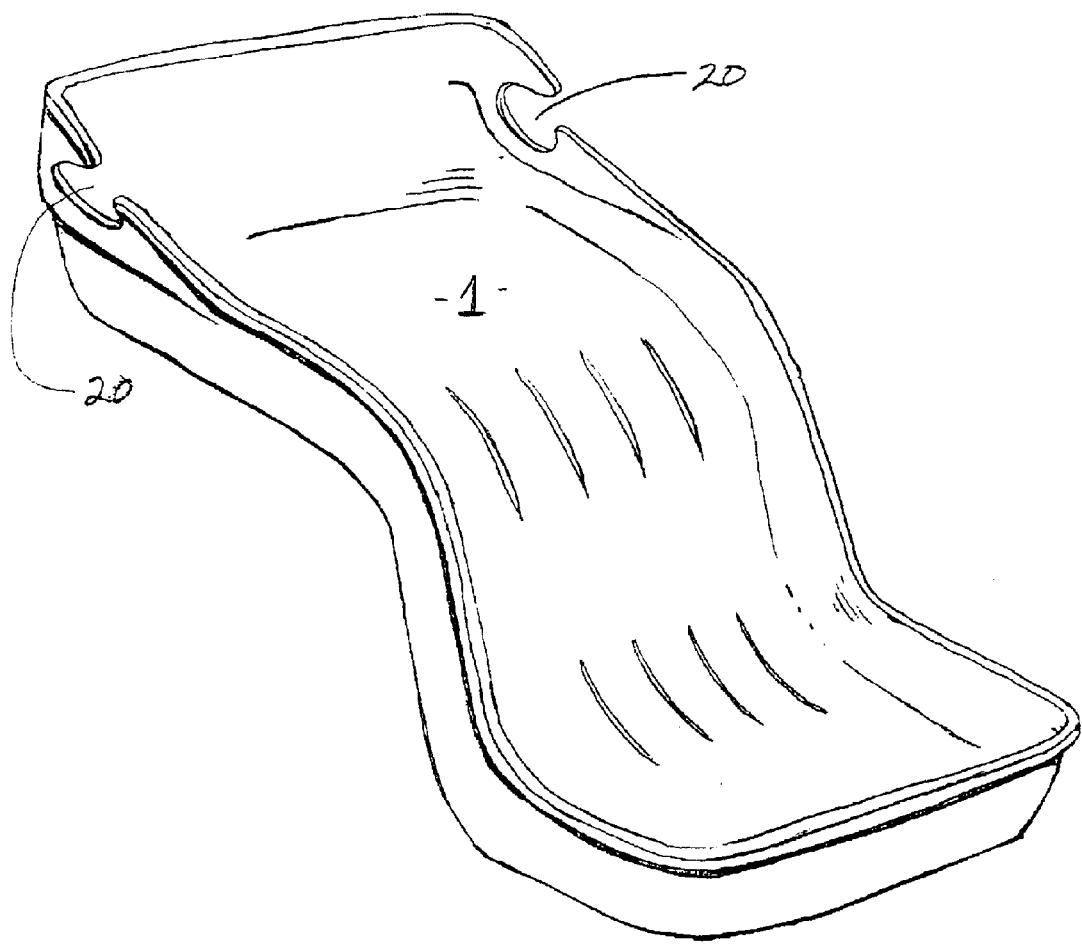
FIG. 3 is a perspective view of another embodiment of the single-piece protective devices of the present invention.

FIG. 3 is another embodiment of the present invention which includes a single-piece mat 1, having substantially similar features to the embodiment shown in FIG. 1, with the exception that the pass-throughs 20 for the safety belts of an automobile seat are contours in the mat perimeter itself, near the point where the automobile seat and automobile seat back contact the mat.

Figure 4:
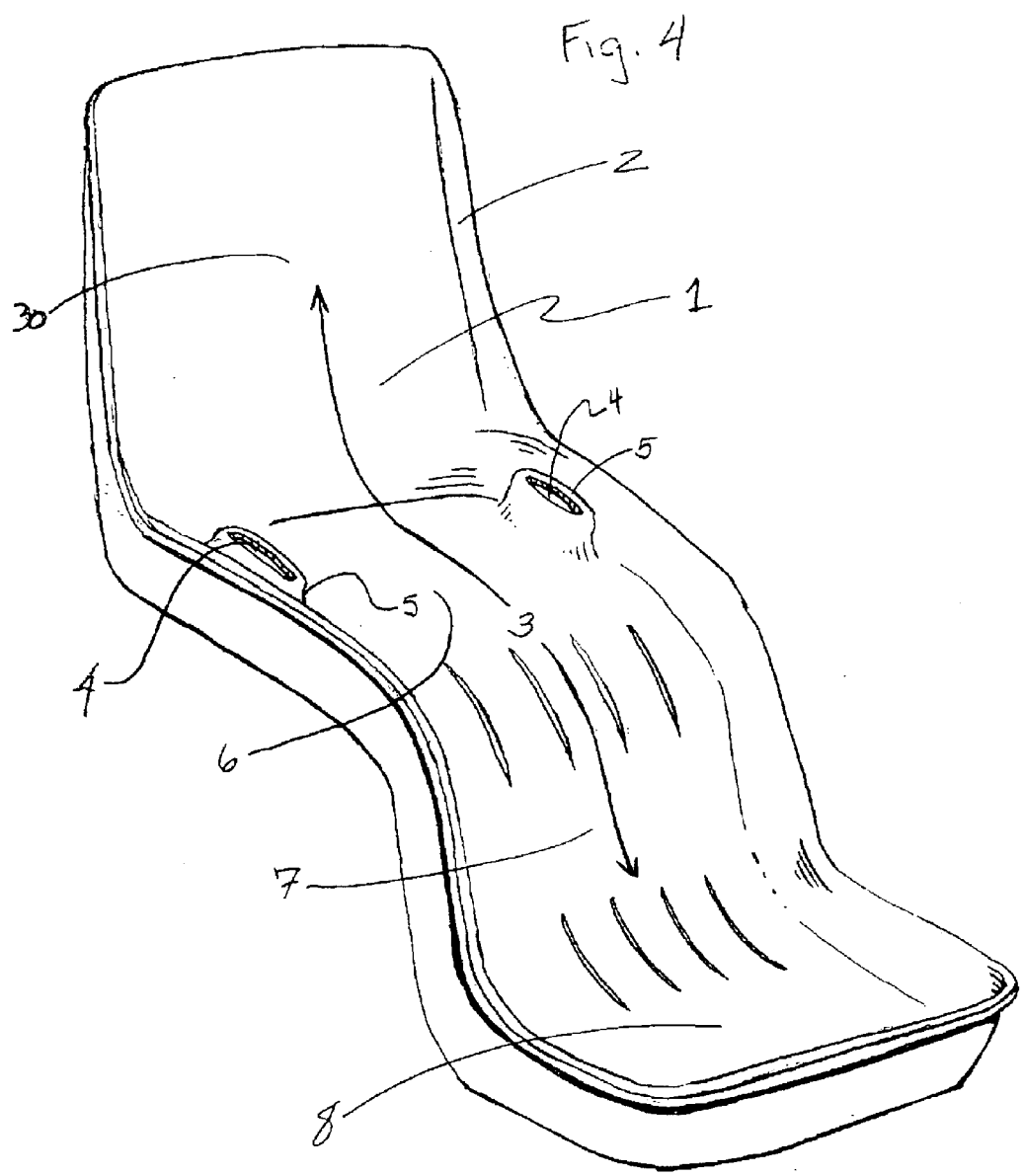
FIG. 4 is a perspective view of another embodiment of the single-piece protective devices of the present invention.
Figure 5:
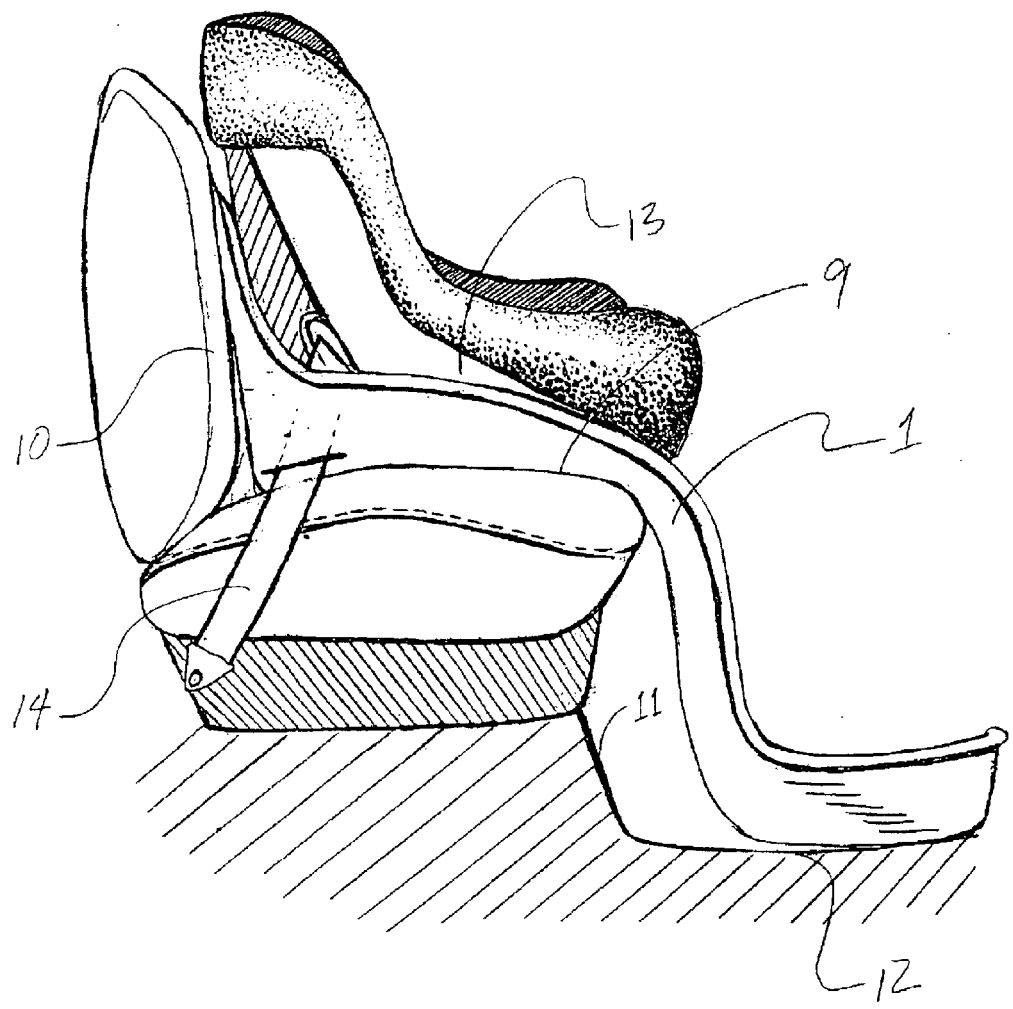
FIG. 5 is a profile view of another embodiment of the single-piece protective devices of the present invention as installed on an automobile seat.

As shown in the perspective view in FIG. 4, another embodiment of the present invention includes a single-piece mat 1, having a ridge 2 around the perimeter of the mat 1 that extends outward substantially normally from the mat surface to create a containment area 3 within the mat. The mat also contains pass-throughs 4 for the safety belts of an automobile seat. The pass-throughs 4 of the mat 1 also contain ridges 5 along their perimeters that maintain the integrity of the mat containment area 3. The single-piece mat 1 contains at least one substantially horizontal surface 6 that conforms to the seat of the automobile, at least one substantially vertical surface that conforms to the automobile seat back 30, at least one substantially vertical surface 7 that conforms to the vertical surface of a passenger foot well beneath the automobile seat, and at least one substantially horizontal surface 8 that conforms to the horizontal surface of a passenger foot well. In FIG. 5, the single-piece mat 1 of FIG. 4 is shown in profile view as installed on an automobile seat 9. Safety seat 13 is installed on top of the mat 1, and held in place with the seat belt 14. Conformal surfaces of mat 1 conform to the vertical surface of the seat back 10, the horizontal surface of the seat 9, the vertical surface of the foot well 11, and the horizontal surface of the foot well 12.

Figure 6:
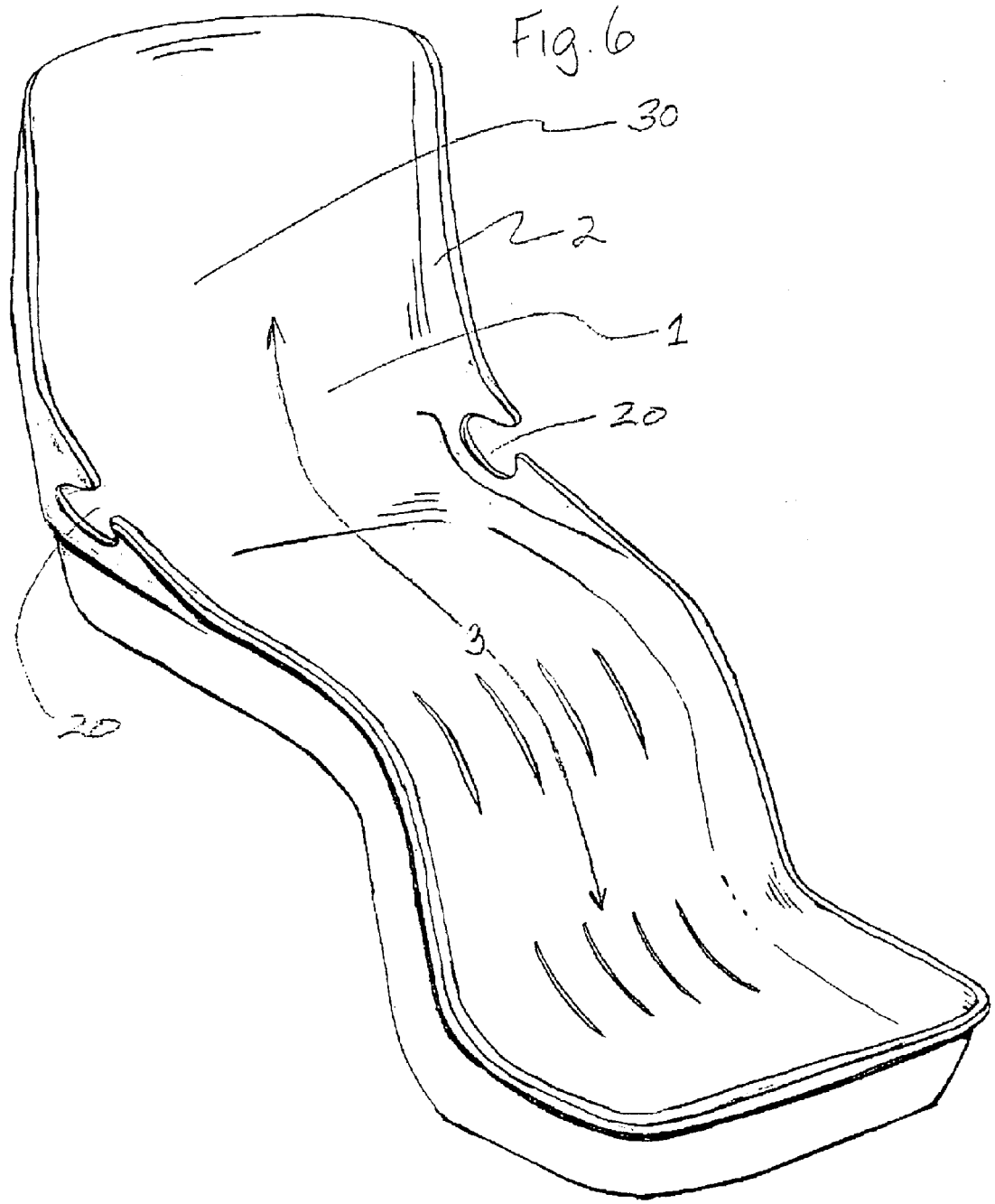
FIG. 6 is a perspective view of another embodiment of the single-piece protective devices of the present invention.
Figure 7:
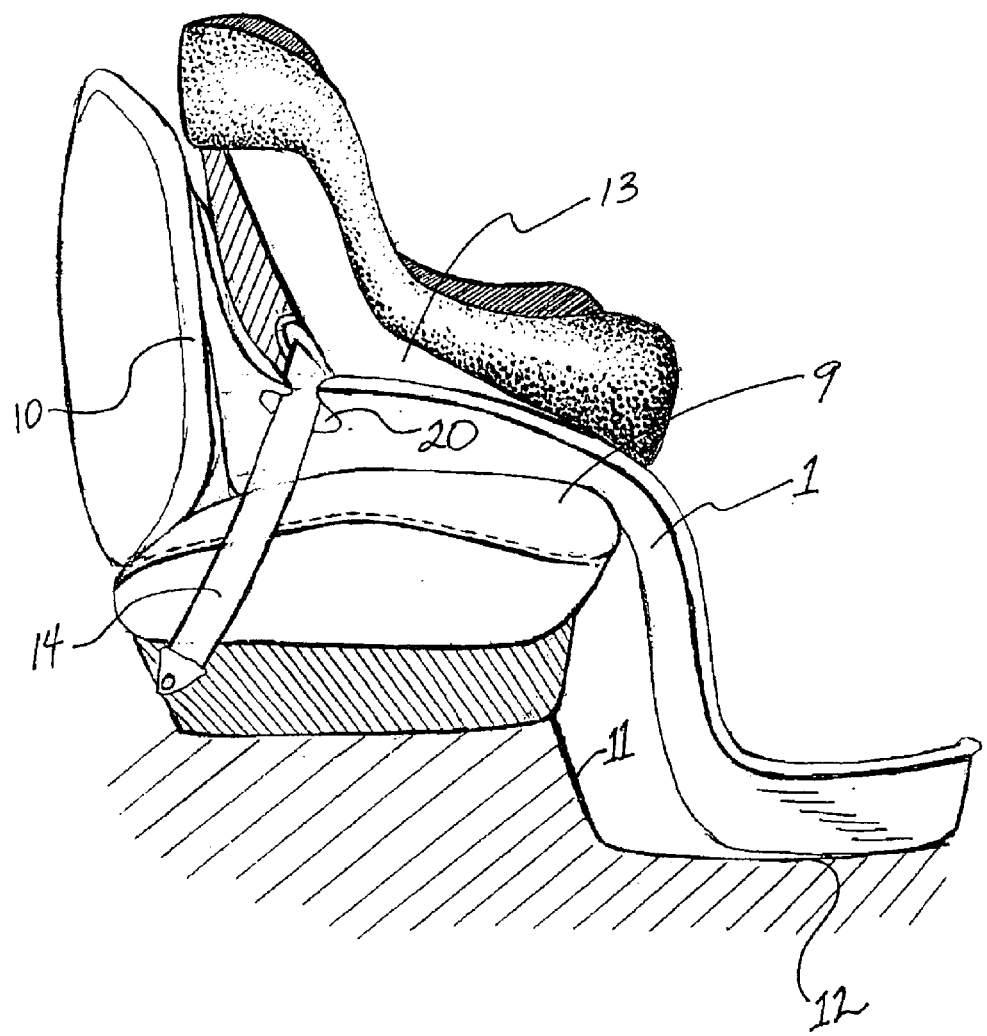
FIG. 7 is a profile view of another embodiment of the single-piece protective devices of the present invention as installed on an automobile seat.

FIG. 6 is another embodiment of the present invention which includes a single-piece mat 1, having substantially similar features to the embodiment shown in FIG. 4, with the exception that the pass-throughs 20 for the safety belts of an automobile seat are contours in the mat perimeter itself, near the point where the automobile seat and automobile seat back contact the mat. In FIG. 7, the single-piece mat 1 of FIG. 6 is shown in profile view as installed on an automobile seat 9. Safety seat 13 is installed on top of the mat 1, and held in place with the seat belt 14, which is fed through pass-through 20. Conformal surfaces of mat 1 conform to the vertical surface of the seat back 10, the horizontal surface of the seat 9, the vertical surface of the foot well 11, and the horizontal surface of the foot well 12.

Figure 8:
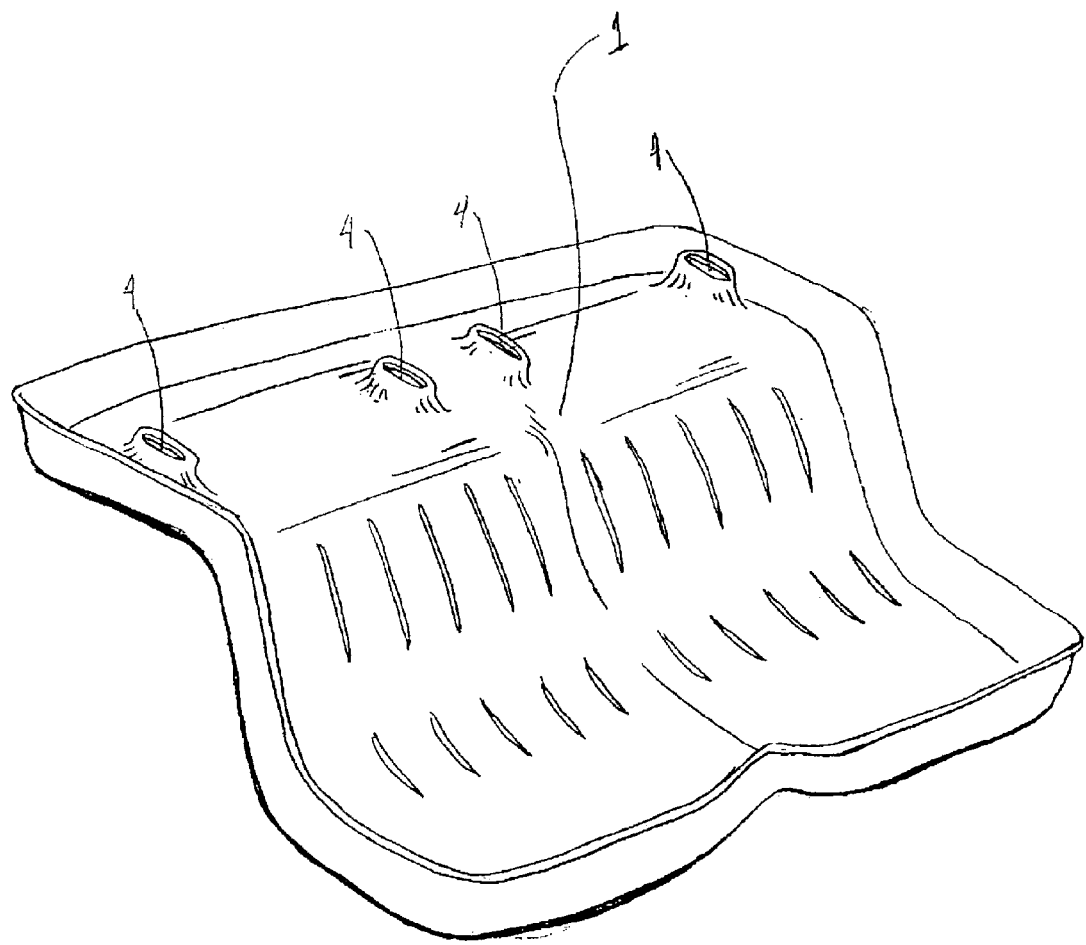
FIG. 8 is a perspective view of another embodiment of the single-piece protective devices of the present invention, for use with two safety seats.

FIG. 8 is another embodiment of the present invention which includes a single-piece mat 1, having substantially similar features to the embodiment shown in FIG. 1, but which is designed to accommodate up to two automobile safety seats, and which includes four pass-throughs 4 for automobile safety belts.

Figure 9:
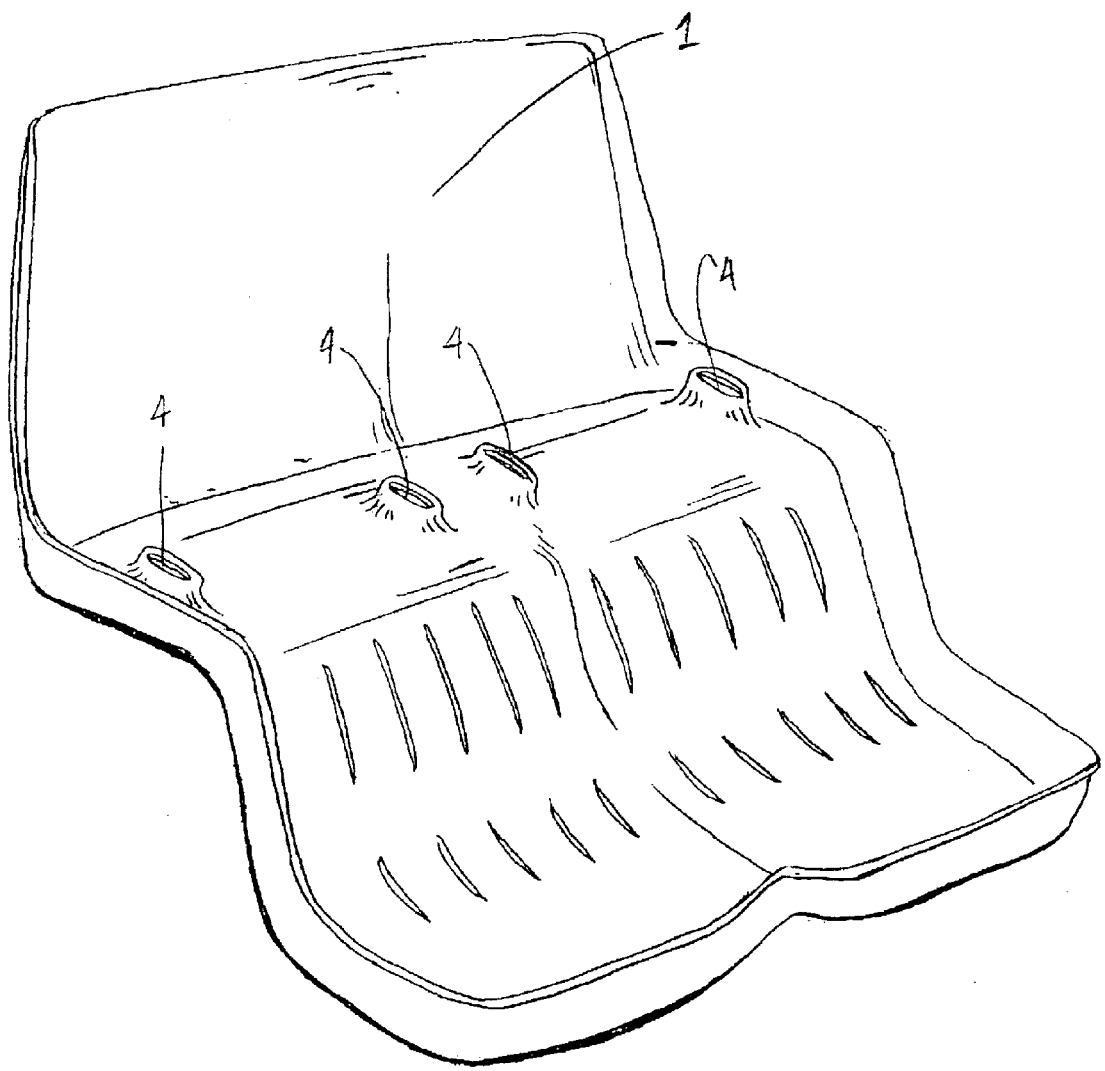
FIG. 9 is a perspective view of another embodiment of the single-piece protective devices of the present invention, for use with two safety seats.

FIG. 9 is another embodiment of the present invention which includes a single-piece mat 1, having substantially similar features to the embodiment shown in FIG. 4, but which is designed to accommodate up to two automobile safety seats, and which includes four pass-throughs 4 for automobile safety belts.

Figure 10:
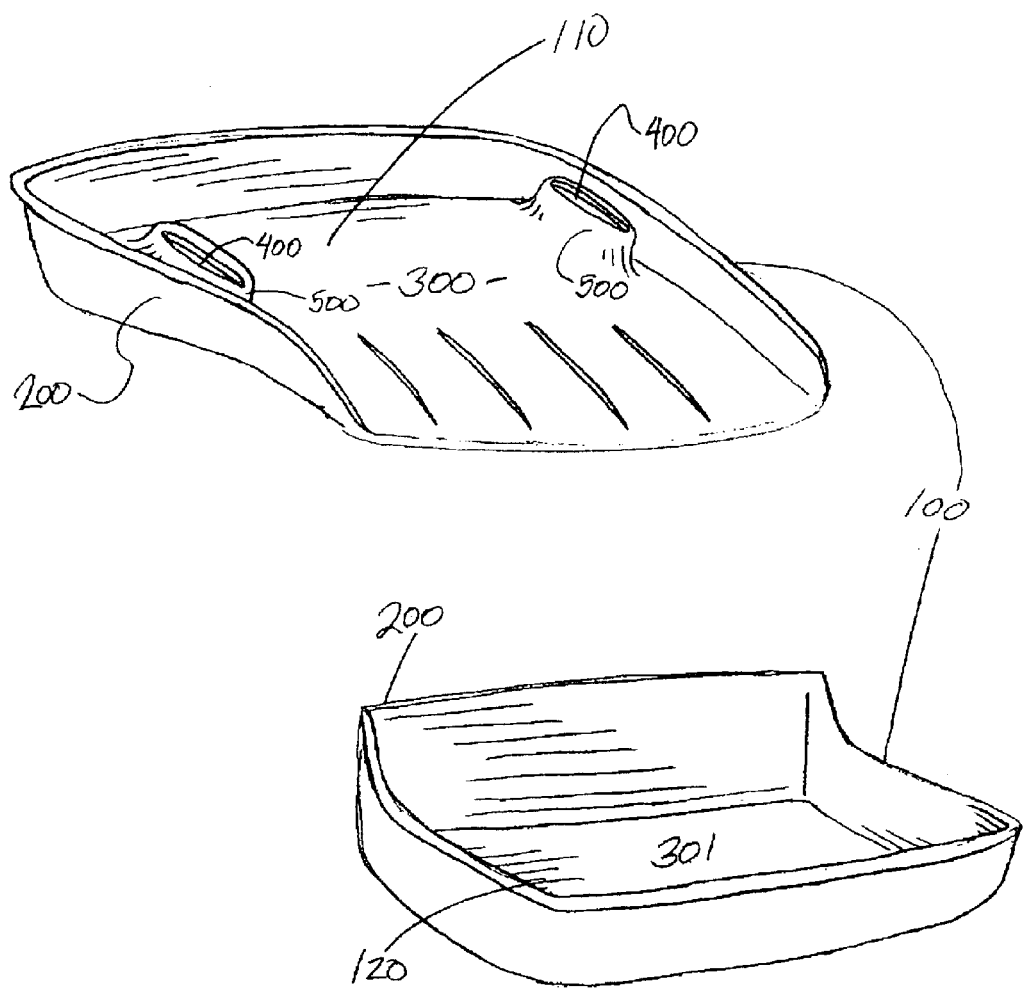
FIG. 10 is a perspective view of one embodiment of the multiple-piece protective devices of the present invention.
Figure 11:
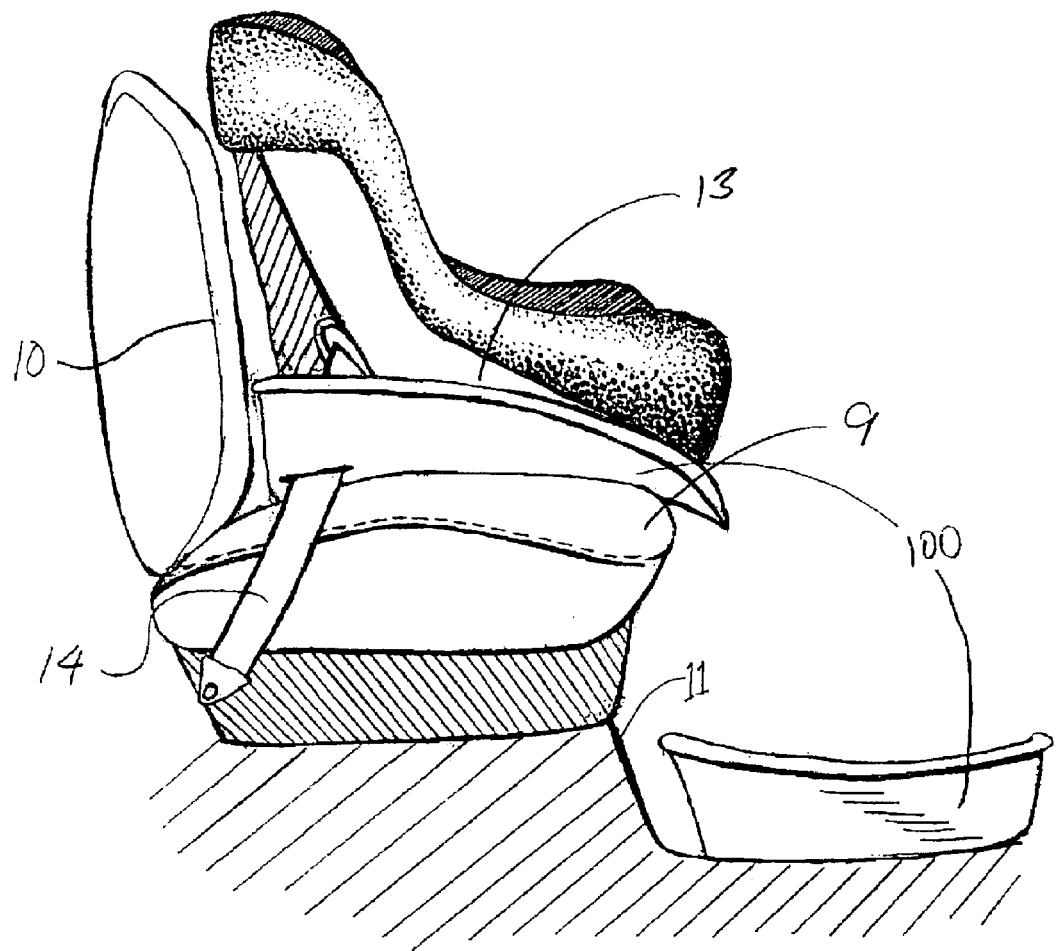
FIG. 11 is a profile view of one embodiment of the multiple-piece protective devices of the present invention as installed on an automobile seat.

As shown in the perspective view in FIG. 10, another embodiment of the present invention includes a multiple-piece mat 100, which contains a substantially horizontal surface that conforms to the seat 110 of an automobile, and a substantially horizontal surface 120 that conforms to the horizontal surface of a passenger foot well. Each piece of mat 100 includes a ridge 200 around the perimeter of the mat surfaces 110, 120 that extends outward substantially normally from the mat surfaces to create containment areas 300, 301 within the mat. The substantially horizontal surface of mat 100 also contains pass-throughs 400 for the safety belts of an automobile seat. The pass-throughs 400 of the mat 100 also contain ridges 500 along their perimeters that maintain the integrity of the mat containment area 300. In FIG. 11, the multiple-piece mat 100 of FIG. 10 is shown in profile view as installed on an automobile seat 9. Safety seat 13 is installed on top of the mat 100, and held in place with the seat belt 14. Conformal surfaces of mat 100 conform to the vertical surface of the seat back 10, the horizontal surface of the seat 9, the vertical surface of the foot well 11, and the horizontal surface of the foot well 12.

Figure 12:
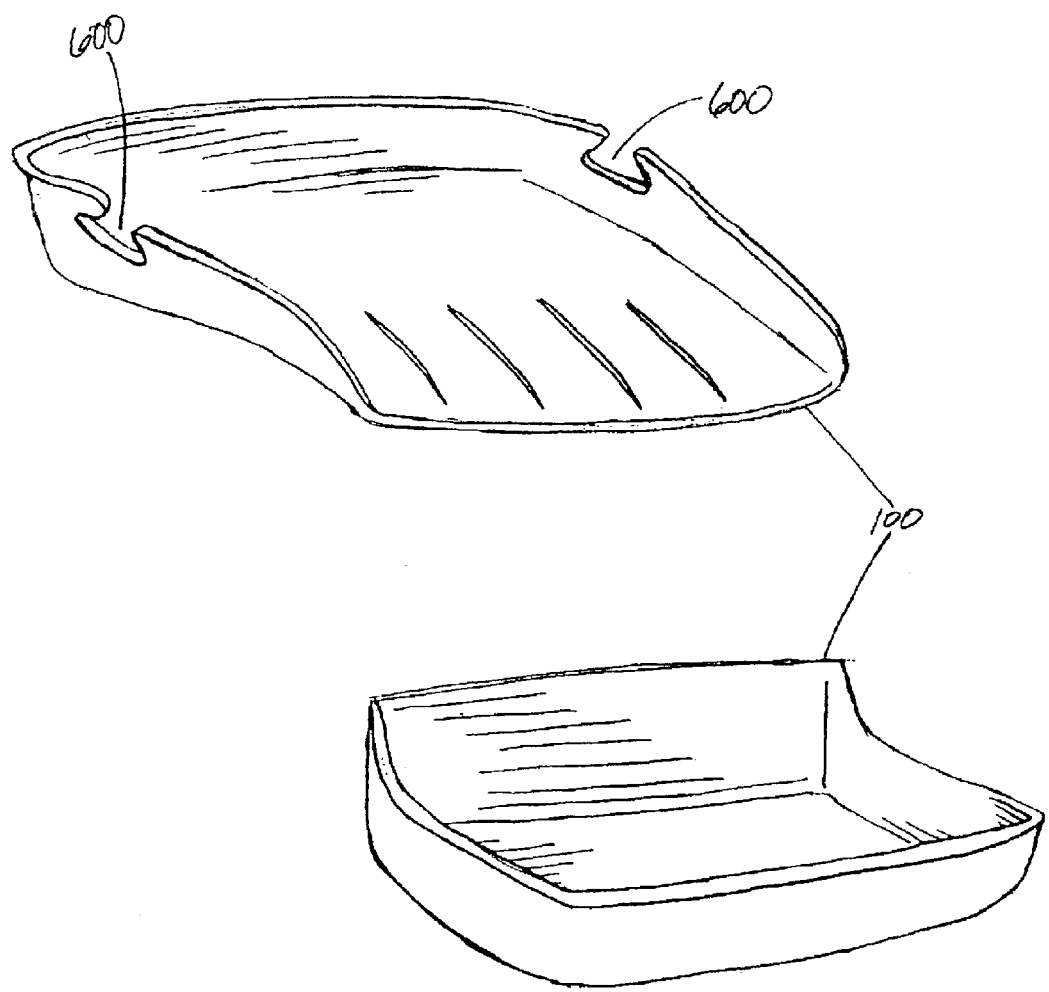
FIG. 12 is a perspective view of another embodiment of the multiple-piece protective devices of the present invention

FIG. 12 is another embodiment of the present invention which includes a multiple-piece mat 100, having substantially similar features to the embodiment shown in FIG. 10, with the exception that the pass-throughs 600 for the safety belts of an automobile seat are contours in the mat perimeter itself, near the point where the automobile seat back and automobile seat back contact the mat.

Figure 13:
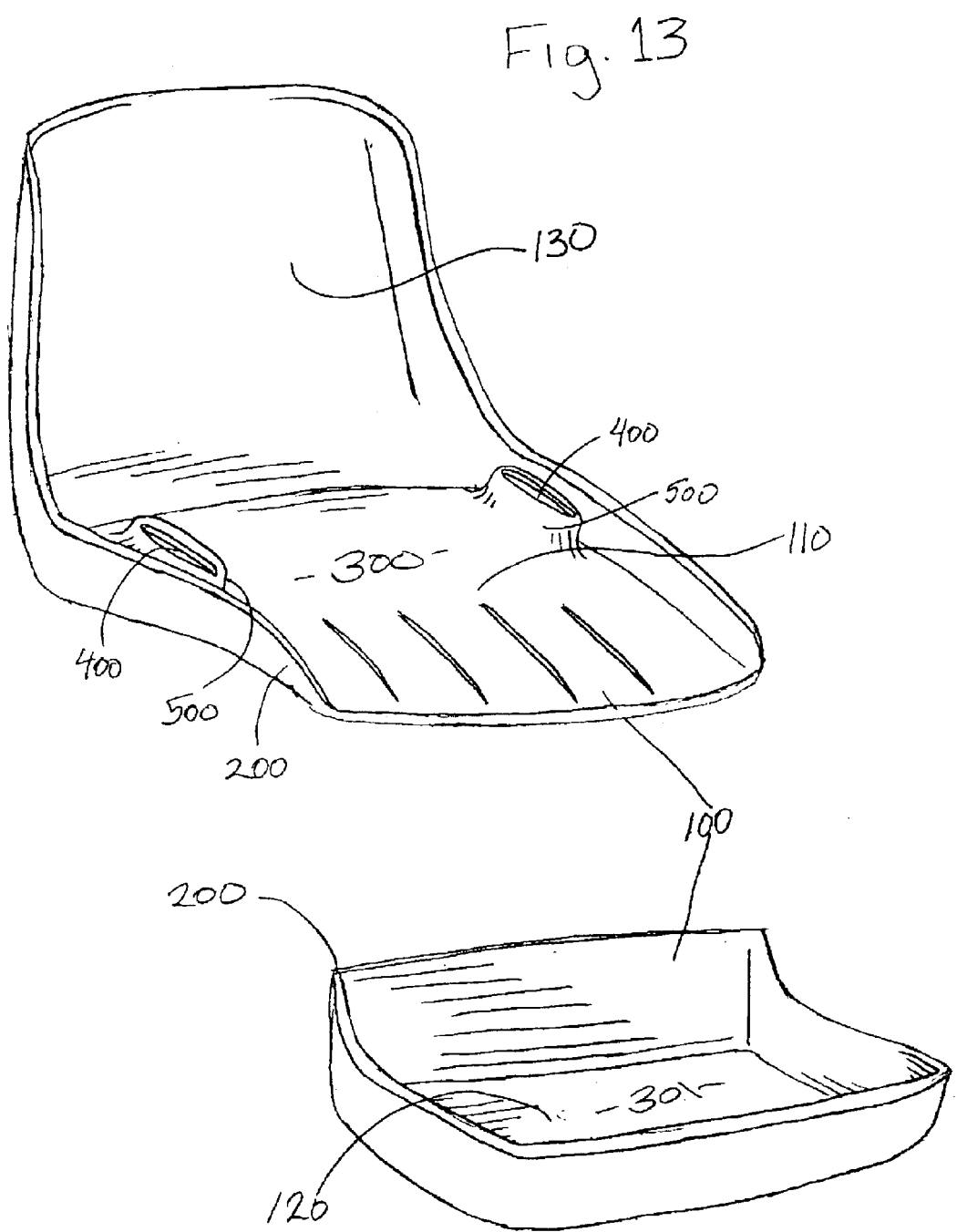
FIG. 13 is a perspective view of another embodiment of the multiple-piece protective devices of the present invention.
Figure 14:
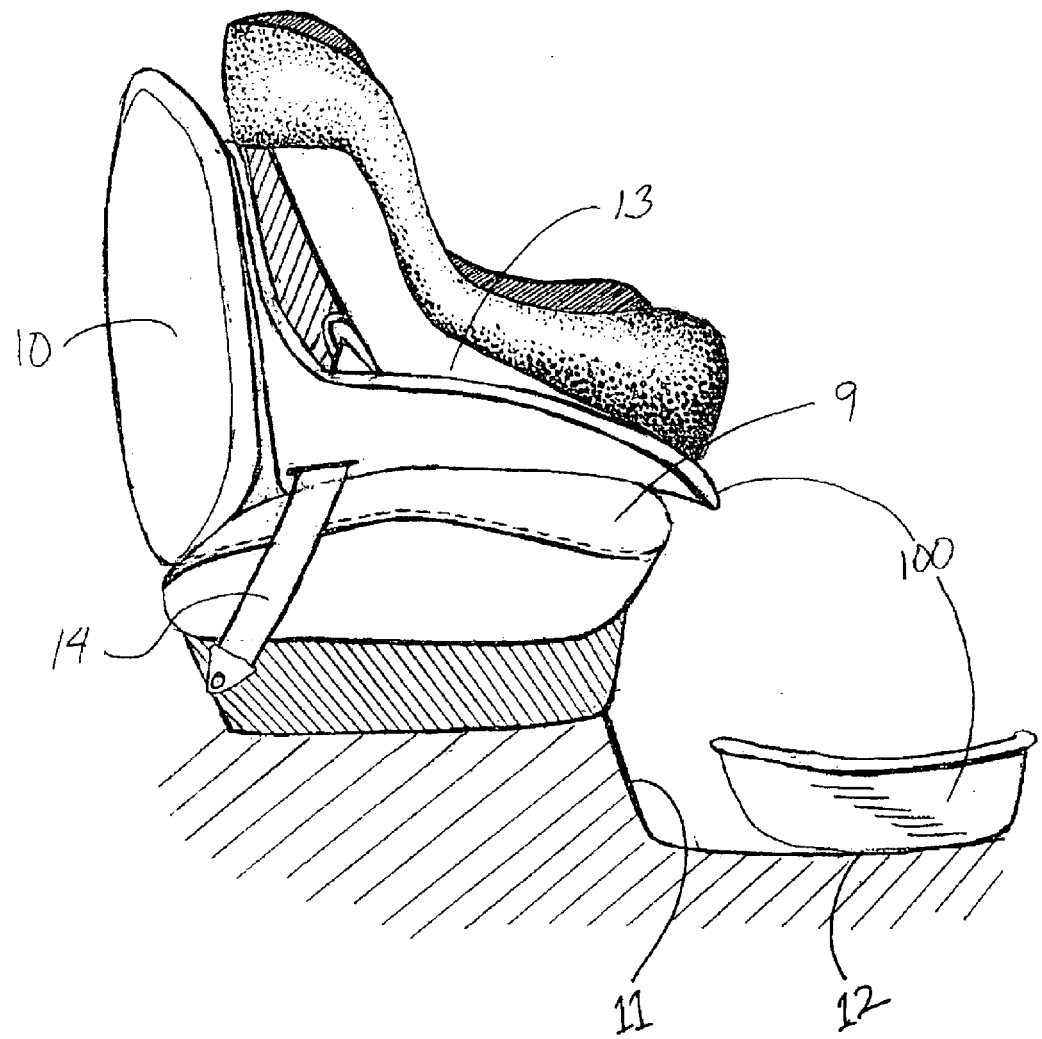
FIG. 14 is a profile view of another embodiment of the multiple-piece protective devices of the present invention as installed on an automobile seat.

As shown in the perspective view in FIG. 13, another embodiment of the present invention includes a multiple-piece mat 100, that contains a substantially horizontal surface that conforms to the seat of the automobile 110, a substantially vertical surface that conforms to the automobile seat back 130, and a substantially horizontal surface 120 that conforms to the horizontal surface of a passenger foot well. Each piece of mat 100 includes a ridge 200 around the perimeter of the mat surfaces 110, 120 that extends outward substantially normally from the mat surfaces to create containment areas 300, 301 within the mat. The substantially horizontal surface 110 of mat 100 also contains pass-throughs 400 for the safety belts of an automobile seat. The pass-throughs 400 of the mat 100 also contain ridges 500 along their perimeters that maintain the integrity of the mat containment area 300. In FIG. 14, the single-piece mat 100 of FIG. 13 is shown in profile view as installed on an automobile seat 9. Safety seat 13 is installed on top of the mat 100, and held in place with the seat belt 14. Conformal surfaces of mat 100 conform to the vertical surface of the seat back 10, the horizontal surface of the seat 9, the vertical surface of the foot well 11, and the horizontal surface of the foot well 12.

Figure 15:
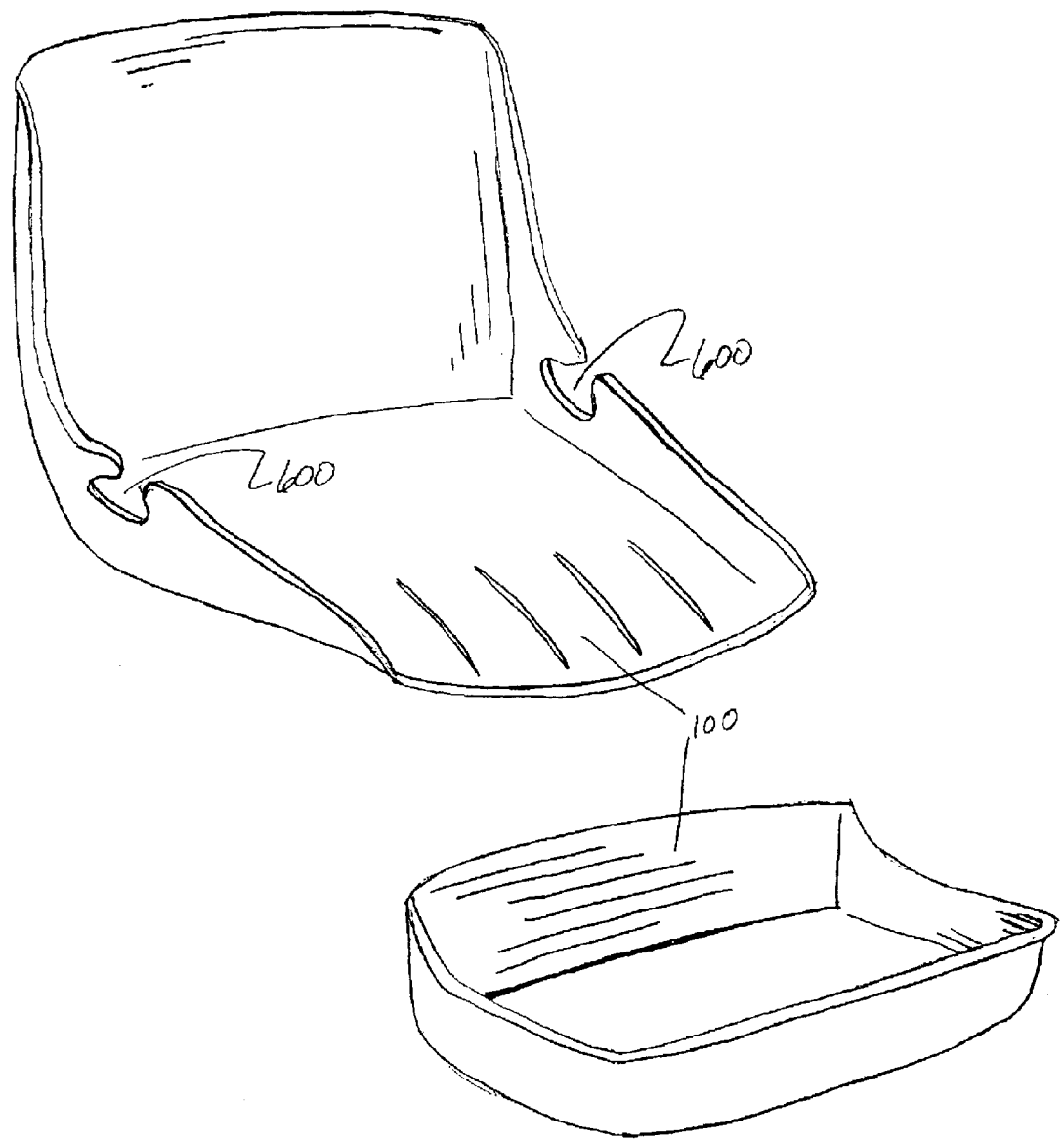
FIG. 15 is a perspective view of another embodiment of the multiple-piece protective devices of the present invention.

FIG. 15 is another embodiment of the present invention which includes a multiple-piece mat 100, having substantially similar features to the embodiment shown in FIG. 13, with the exception that the pass-throughs 600 for the safety belts of an automobile seat are contours in the mat perimeter itself, near the point where the automobile seat and automobile seat back contact the mat.

Figure 16:
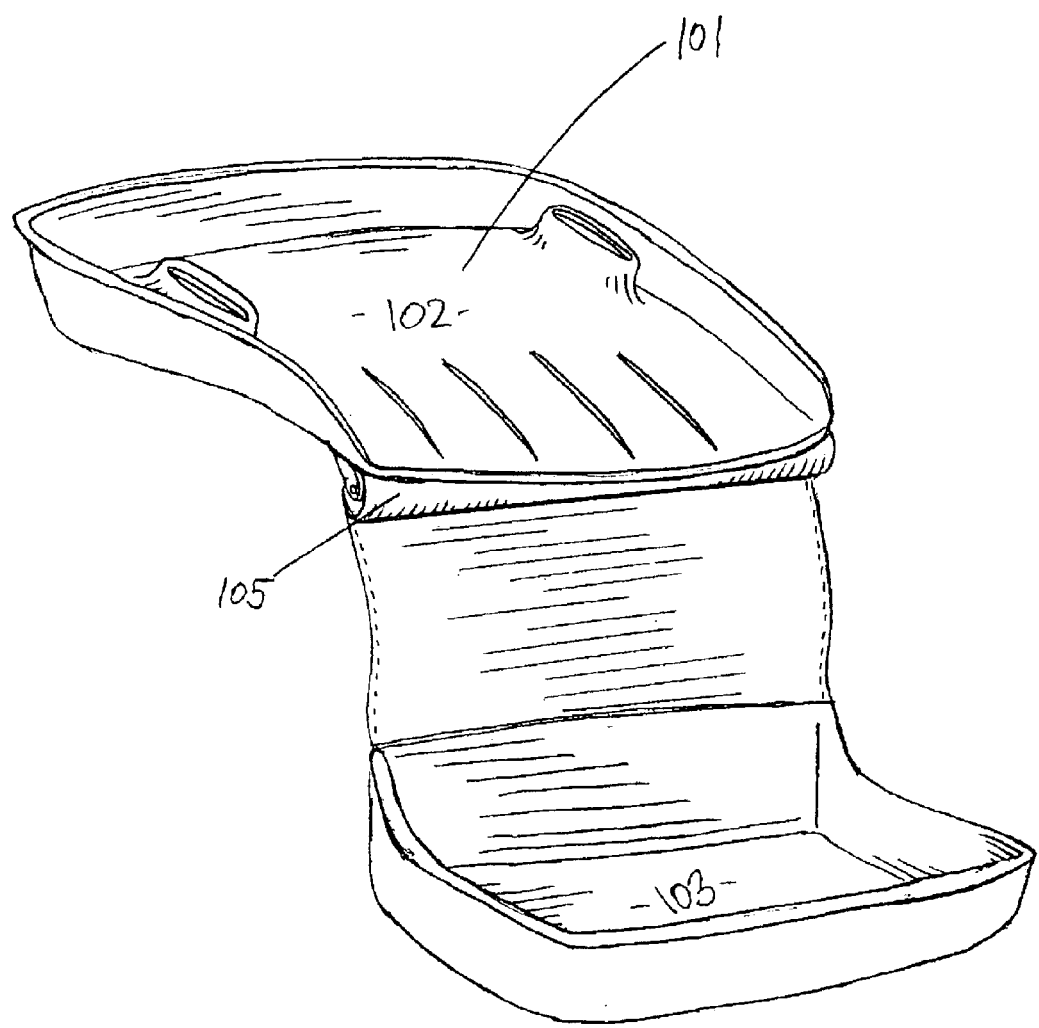
FIG. 16 is a perspective view of another embodiment of the single-piece protective devices of the present invention, including a roll-up feature in the extended position.
Figure 17:
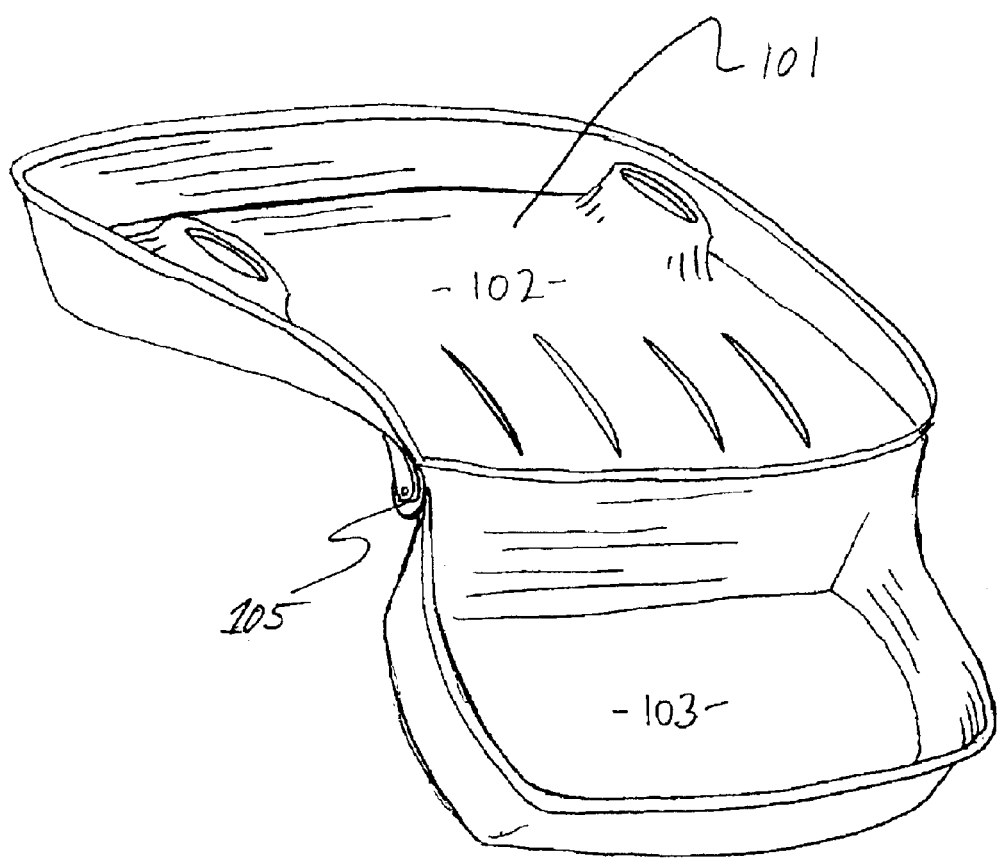
FIG. 17 is a perspective view of another embodiment of the single-piece protective devices of the present invention, including a roll-up feature in the retracted position.

FIG. 16 is another embodiment of the present invention which includes a single-piece mat 101, having substantially similar features to the embodiment shown in FIG. 10, with the exception that the mat pieces 102, 103 are joined by a roll-up sheet mechanism 105 that can be extended when the mat is in use and retracted when the mat is stored. As shown in FIG. 16, the roll-up sheet mechanism 105 is in the extended position. As shown in FIG. 17, the roll-up sheet mechanism 105 is in the retracted position.

Figure 18:
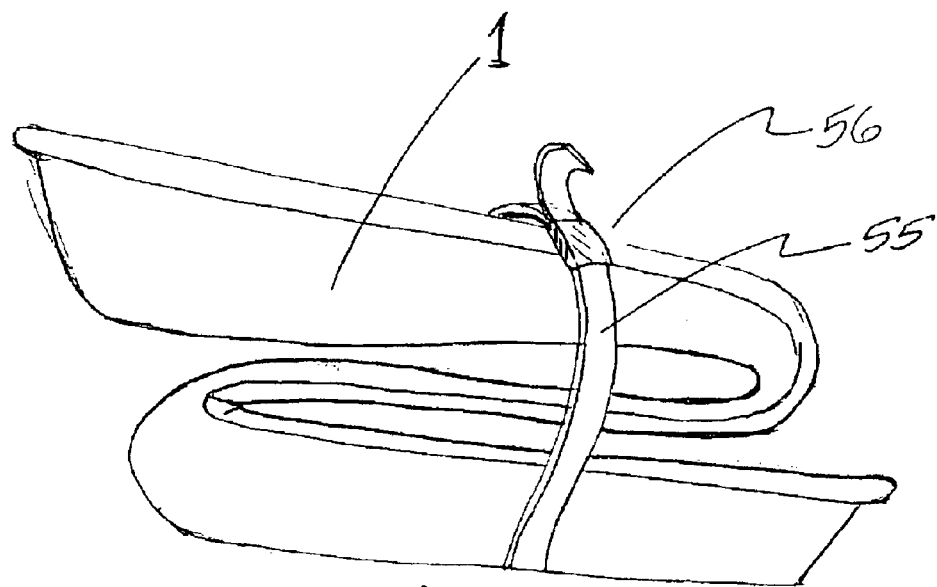
FIG. 18 is a profile view of another embodiment of the single-piece protective devices of the present invention, in a folded position.
Figure 19:
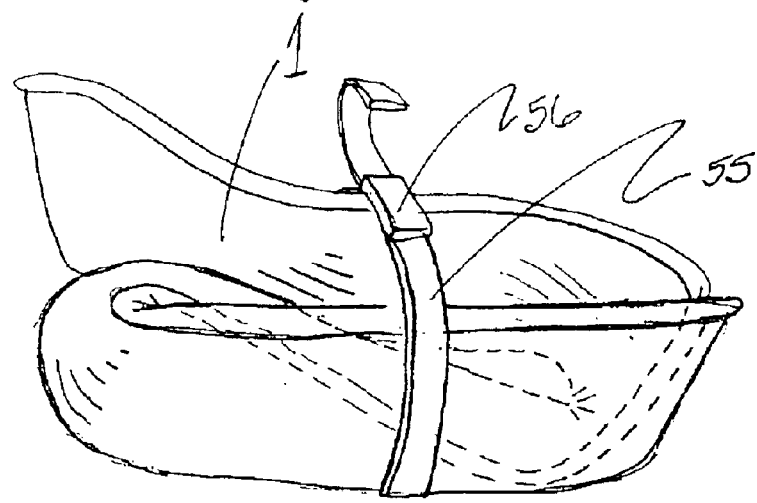
FIG. 19 is a profile view of another embodiment of the single-piece protective devices of the present invention, in a folded position.

FIG. 18 is another embodiment of the present invention which includes a single-piece mat 1, having substantially similar features to the embodiment shown in FIG. 1, with the exception that the mat is comprised of a plastic material that allows it to be folded for storage as shown in FIG. 18. In addition, the mat can contain features such as straps 55 and snaps or buckle 56 that hold the mat in a folded position for storage. In FIG. 19, yet another embodiment of the present invention which includes a single-piece mat 1, having substantially similar features to the embodiment shown in FIG. 1, with the exception that the mat is comprised of a plastic material that allows it to be folded into itself, and substantially flat for storage as shown in FIG. 19. In addition, the mat can contain features such as straps 55 and snaps or buckle 56 that hold the mat in a folded position for storage.

Figure 20:
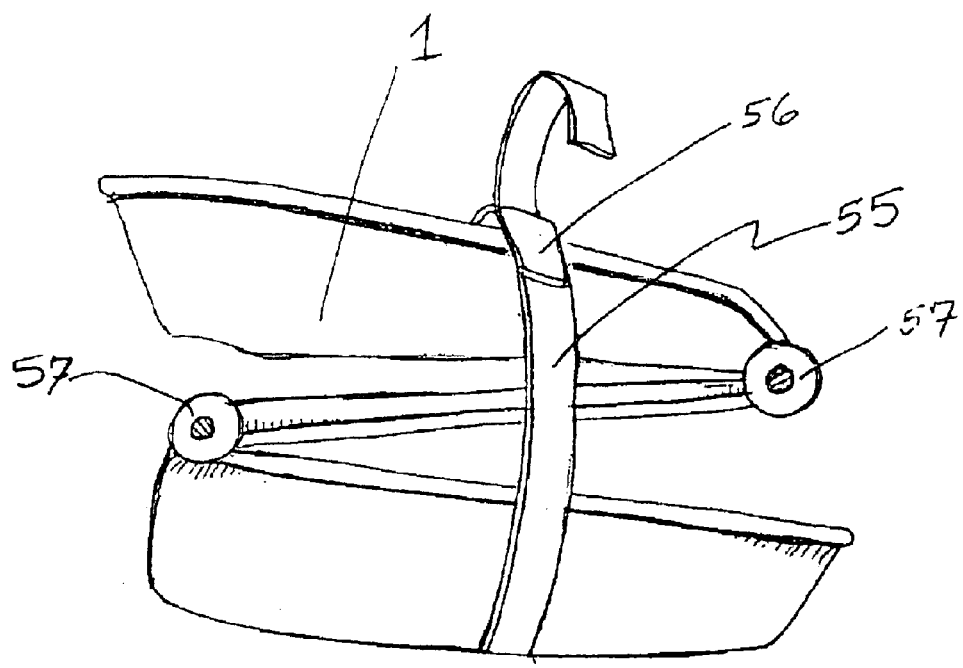
FIG. 20 is a profile view of another embodiment of the single-piece protective devices of the present invention, in a folded position.

FIG. 20 is another embodiment of the present invention which includes a single-piece mat 1, having substantially similar features to the embodiment shown in FIG. 1, with the exception that the mat contains hinge mechanisms 57 between the various horizontal and vertical surfaces that allows it to be folded for storage as shown in FIG. 20. In addition, the mat can contain features such as straps 55 and snaps or buckle 56 that hold the mat in a folded position for storage. Alternatively, the hinge mechanisms 57 can contain internal ratchet devices that hold the mat in a folded position until such ratchet devices are disengaged by the user.

Figure 21:
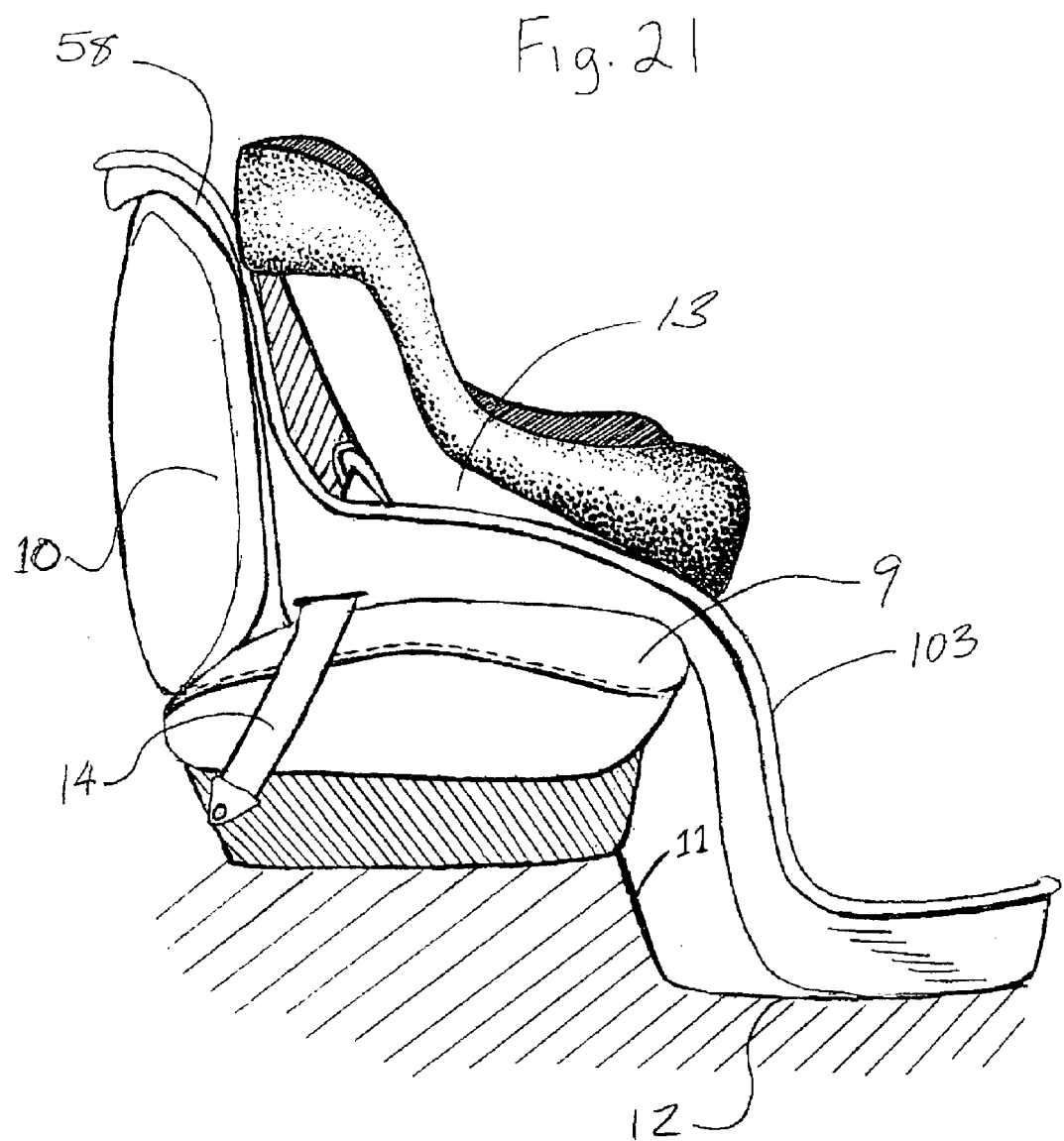
FIG. 21 is a profile view of another embodiment of the single-piece protective devices of the present invention.

In FIG. 21, another embodiment of a single-piece mat 103 similar to that as shown in FIG. 4 is shown in profile view as installed on an automobile seat 9. Safety seat 13 is installed on top of the mat 103, and held in place with the seat belt 14. Conformal surfaces of mat 103 conform to the vertical surface of the seat back 10, the horizontal surface of the seat 9, the vertical surface of the foot well 11, and the horizontal surface of the foot well 12. The perimeter of mat 103 also includes a top portion with a cup-shaped reverse bend 58 that fits over the top of the automobile seat back 10 and assists in securing the mat 103 to the automobile seat back 10.

Figure 22:
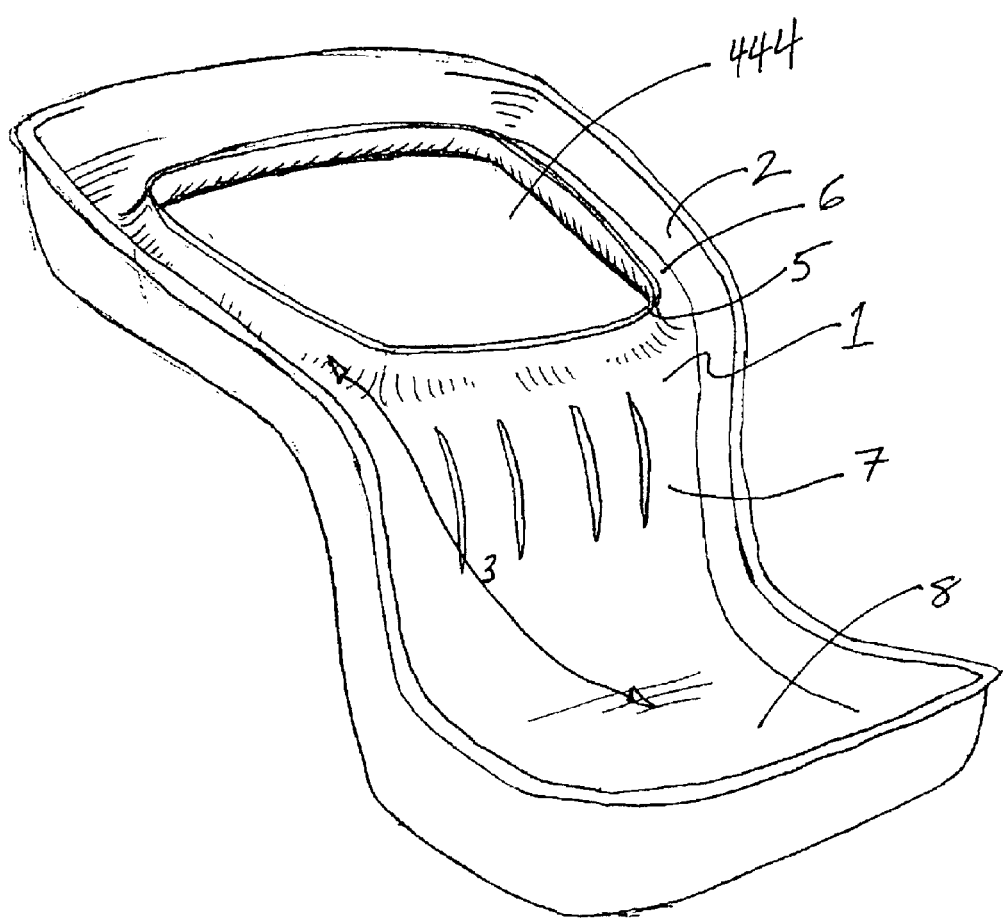
FIG. 22 is a perspective view of another embodiment of the single-piece protective devices of the present invention.

FIG. 22 is another embodiment of the present invention which includes a single-piece mat 1, having substantially similar features to the embodiment shown in FIG. 1, with the exception that the mat contains a single pass-through 444, which is large enough to allow passage of a safety belt, and also allow the bottom of the safety seat itself to rest on the car seat rather than the conformal surfaces of the mat 1. As shown in FIG. 22, a ridge 2 around the perimeter of the mat 1 that extends outward substantially normally from the mat surface to create a containment area 3 within the mat. The pass-through 444 of the mat 1 also contains a ridge 5 along its perimeter to maintain the integrity of the mat containment area 3. The single-piece mat 1 contains at least one substantially horizontal surface 6 that conforms to the seat of the automobile, at least one substantially vertical surface 7 that conforms to the vertical surface of a passenger foot well beneath the automobile seat, and at least one substantially horizontal surface 8 that conforms to the horizontal surface of a passenger foot well.

Figure 23:
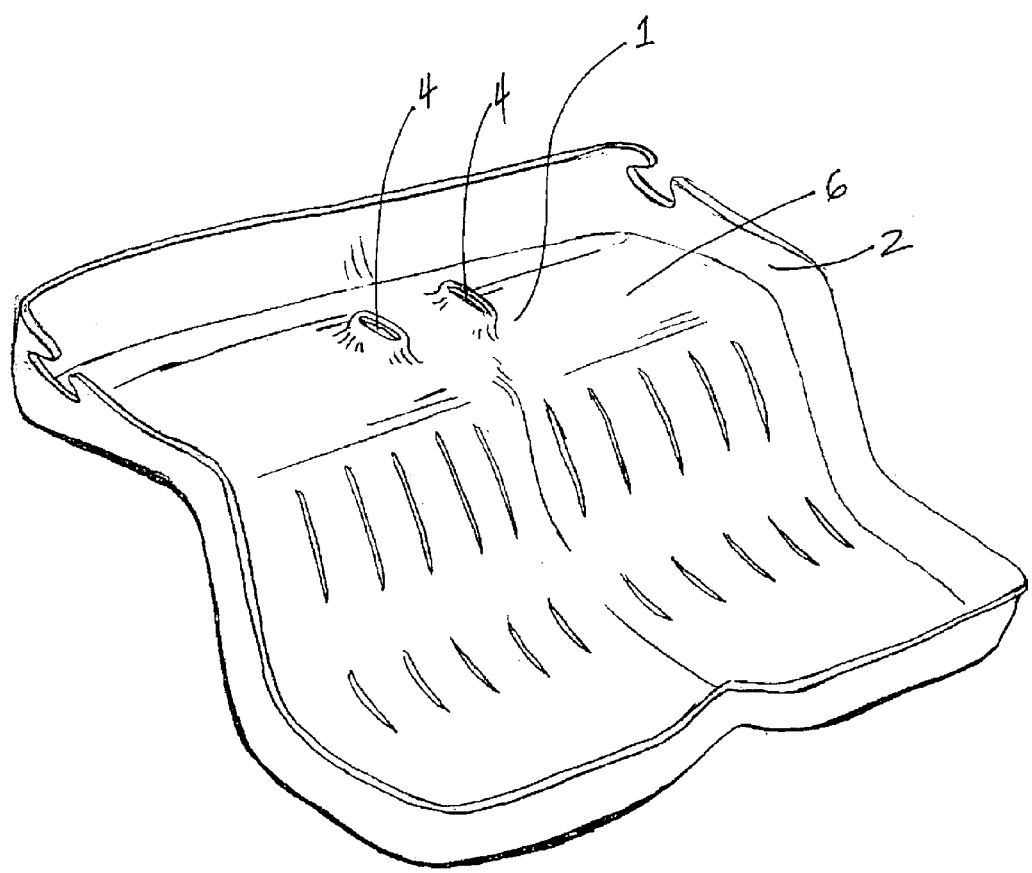
FIG. 23 is a perspective view of another embodiment of the single-piece protective devices of the present invention for use with two safety seats.

FIG. 23 is another embodiment of the present invention which includes a single-piece mat 1, having substantially similar features to the embodiment shown in FIG. 8, but which is designed to accommodate up to two automobile safety seats, and which includes two pass-throughs 4 in the substantially horizontal surface 6 that conforms to the seat surface and two pass-throughs 20 in perimeter ridge 2 for automobile safety belts.

Although the present invention has been described for use primarily in connection with an automobile seat, it is to be expressly understood that it is within the scope of the present invention that the devices described herein can be used in any moving vehicle, whether private or public, including without limitation, airplanes, buses, motor-homes, trains, trucks, boats and hovercraft.

The foregoing description of the invention has been presented for purposes of illustration and description. Further, the description is not intended to limit the invention to the form disclosed herein. Consequently, variations and modifications commensurate with the above teachings, and the skill or knowledge in the relevant art, are within the scope of the present invention. The embodiment described hereinabove is further intended to explain modes for practicing the invention and to enable others skilled in the art to utilize the invention in various embodiments and with various modifications required by their particular applications or uses of the invention. It is intended that the appended claims be construed to include alternate embodiments to the extent permitted by the prior art.

What is claimed is:

1. A device for a moving vehicle having an interior seat, seat back and foot well for protecting said interior seat, seat back and foot well from being soiled by a child in a safety seat, comprising:

a mat having a perimeter and having a conformal surface for placement between a safety seat having a base and a lateral confinement, and said seat of the vehicle, said mat having a lateral dimension and a longitudinal dimension, wherein said mat lateral dimension extends beyond the lateral confinement of said safety seat and has a flange outwardly extending at least 1 inch from said conformal surface and around at least a portion of the perimeter of said mat to define a containment area, said mat containment area includes a pass-through for a safety belt having a perimeter and a flange outwardly extending at least 1 inch from said conformal surface of said mat that extends around at least a portion of the perimeter of said pass-through to maintain the integrity of said containment area for containment of liquid spills within said mat, and said mat longitudinal dimension further extends beyond the base of said safety seat and into said foot well.

2. The device as claimed in claim 1, wherein said mat longitudinal dimension further includes an extended surface that conforms to said vehicle seat back.

3. The device as claimed in claim 1, wherein said mat is plastic, and is capable of being folded.

4. The device as claimed in claim 1, wherein said foot well includes horizontal surface and a vertical surface, and wherein said conformal surface of said mat includes a horizontal portion that conforms to said seat, a vertical portion that conforms to said vertical foot well surface, and a horizontal portion that conforms to said horizontal foot well surface.

5. The device as claimed in claim 4, wherein said conformal surface of said mat further includes a vertical portion that conforms to said seat back.

6. The device as claimed in claim 1, wherein said mat accommodates more than one safety seat.

7. The device as claimed in claim 1, wherein said mat lateral dimension extends beyond the lateral confinement of said safety seat at least 3 inches.

8. The device as claimed in claim 1, wherein said mat is comprised of multiple pieces.

9. A device for a moving vehicle having an interior seat, seat back and foot well for protecting said interior seat, seat back and foot well from being soiled by a child in a safety seat, comprising:

a mat having a perimeter and having a conformal surface for placement between a safety seat having a base and a lateral confinement, and the seat of a vehicle, said mat having a lateral dimension and a longitudinal dimension, wherein said mat lateral dimension extends beyond the lateral confinement of said safety seat at least 2 inches, and has a flange extending outwardly from said mat surfaces at least 1 inch from said mat conformal surface, said flange extending around the perimeter of said mat to define a containment area for containment of liquid spills within said mat, said mat also contains a pass-through for a safety belt having perimeter and a flange outwardly extending at least 1 inch from said conformal surface of said mat and extending around at least a portion of the perimeter of said pass-through to maintain the integrity of said containment area for containment of liquid spills within said mat.

10. The device as claimed in claim 9, wherein said mat containment area is capable of containing more than one-half liter of liquid.

11. The device as claimed in claim 9, wherein said mat longitudinal dimension further extends beyond the base of said safety seal and into said foot well.

12. The device as claimed in claim 9, wherein said foot well includes a horizontal surface and a vertical surface, and wherein said conformal surface of said mat includes a horizontal portion that conforms to said seat, a vertical portion that conforms to said vertical foot well surface, and a horizontal portion that conforms to said horizontal foot well surface.

13. The device as claimed in claim 12, wherein said conformal surface of said mat further includes a vertical portion that conforms to said seat back.

14. The device as claimed in claim 9, wherein said mat is comprised of multiple pieces.

15. A device for a moving vehicle having an interior seat, seat back and foot well, said foot well having horizontal and vertical surfaces, for protecting said interior seat, seat back, and foot well surfaces from being soiled by a child in a safety seat, comprising:

a mat having a perimeter and having a conformal surface for placement between a safety seat having a base and a lateral confinement, and the seat of a vehicle, said conformal surface of said mat includes a horizontal portion that conforms to said seat, a vertical portion that conforms to said vertical foot well surface, and a horizontal portion that conforms to said horizontal foot well surface, said horizontal portion that conforms to said horizontal foot well surface having a flange extending outwardly at least 1 inch from said mat conformal surface, said flange extending around at least a portion of the perimeter of said mat to define a containment area for containment of liquid spills within said horizontal portion of said mat that conforms to said horizontal foot well surface.

16. The device as claimed in claim 15, wherein said mat has a lateral dimension and said mat lateral dimension extends beyond the lateral confinement of said safety seat at least 2 inches.

17. The device as claimed in claim 15, wherein said mat containment area is capable of containing more than one-half liter of liquid.

18. The device as claimed in claim 15, wherein said conformal surface of said mat further includes a vertical portion that conforms to said seat back.

* * * * *